United States Patent [19]

Abrams et al.

[11] Patent Number: 5,723,085
[45] Date of Patent: Mar. 3, 1998

[54] PROCESS AND APPARATUS FOR MAKING A LEAK PROOF CAP AND BODY ASSEMBLY

[75] Inventors: Robert S. Abrams, Albany; Robert Thomas Garren, Jr., Fultonville, both of N.Y.

[73] Assignee: Capitol Vial, Inc., N.Y.

[21] Appl. No.: 323,038

[22] Filed: Oct. 14, 1994

[51] Int. Cl.[6] .................. B29C 45/42; B29C 65/78
[52] U.S. Cl. .................. 264/238; 264/328.1; 264/336; 425/556; 425/444
[58] Field of Search .................. 264/238, 334, 264/336, 40.1; 425/556, 317, 444; 29/235, 450, 447

[56] References Cited

U.S. PATENT DOCUMENTS

| | | | |
|---|---|---|---|
| 2,991,500 | 7/1961 | Hagan. | |
| 3,537,676 | 11/1970 | Miller | 249/59 |
| 3,730,372 | 5/1973 | Komendowski | 215/32 |
| 3,804,282 | 4/1974 | Komendowski | 215/32 |
| 3,910,740 | 10/1975 | Rees | 425/437 |
| 3,938,675 | 2/1976 | Rees. | |
| 4,134,511 | 1/1979 | Deussen | 215/32 |
| 4,176,755 | 12/1979 | Winchell | 215/32 |
| 4,340,352 | 7/1982 | Hayberg | 425/517 |
| 4,346,515 | 8/1982 | Lodding et al. | 29/773 |
| 4,351,630 | 9/1982 | Hayberg et al. | 425/517 |
| 4,449,914 | 5/1984 | Schmidts et al. | 425/556 |
| 4,783,056 | 11/1988 | Abrams | 264/40.5 |
| 4,812,116 | 3/1989 | Abrams | 249/142 |
| 4,814,134 | 3/1989 | Brown | 264/297.8 |
| 5,037,597 | 8/1991 | McGinley et al. | 264/334 |

*Primary Examiner*—Jill L. Heitbrink
*Attorney, Agent, or Firm*—Burns, Doane, Swecker & Mathis, LLP

[57] ABSTRACT

A process and apparatus for forming a leak proof body and cap. The process including the steps of defining a mold cavity between a first mold part and a second mold part, injecting a molten material into the mold cavity thereby forming from the molten material a body and cap, and retracting the first mold part from the second mold part to separate the first mold part from the body and cap. Thereafter, engaging at least the body with a robotic arm and moving the body with the robotic arm into a capping device while the body and cap are at a temperature at which the material is not fully set. The body is then sealed by moving the cap into engagement with the body to form a leak proof seal.

30 Claims, 3 Drawing Sheets

PROCESS AND APPARATUS FOR MAKING A LEAK PROOF CAP AND BODY ASSEMBLY

BACKGROUND OF THE INVENTION

1. Field of the Invention

The present invention relates to an apparatus and process for making and sealing a cap and body assembly. More particularly, the present invention relates to a process wherein the cap and body assembly is molded, moved to a capping device and then sealed by closing the cap while the plastic of the body and cap has not fully set.

2. Description of Related Art

Leak proof plastic bodies of the type to which the present invention relates are generally injection-molded plastic bodies that have plastic caps adapted to seal the body closed with a substantially hermetic seal. Such bodies are for example, the vials used to collect samples in the dairy industry or other containers having caps. The caps may or may not be integrally connected to the bodies.

In the past such sealed bodies have been made by molding the bodies and caps in a first process and then sterilizing and sealing the caps onto the bodies in a separate process. In order to sterilize the interior of the bodies and to seal the caps onto the bodies, it has been known to heat and seal the caps and bodies under aseptic conditions.

U.S. Pat. No. 4,783,056 discloses a method for accomplishing sealing of a cap onto a vial including a mold with several moving parts in which the vial may be molded and sealed in the same apparatus. This method of forming and sealing an aseptic vial eliminates the additional step of sealing the vial under aseptic conditions because the sealing is done directly in the mold while the vial is still hot enough to maintain the necessary pliability and sterility of the vial. However, this method requires the use of a mold which has moving parts for closing and sealing the cap on the vial.

OBJECTS AND SUMMARY

The present invention relates to a process for forming and sealing a cap and a body with a leak proof seal where the body is transferred from a mold where it is made to a capping device while the material of the body is still not fully set. The body is removed from the mold with a robotic arm and transferred to the capping device where the cap is placed on the body before the material of the cap and body has fully set to establish a leak proof seal between the body and cap.

More specifically, the invention relates to a process for forming a leak proof body and cap including steps of defining a mold cavity between a first mold part and a second mold part, injecting a molten material into the mold cavity thereby forming from the molten material a body and cap, and retracting the first mold part from the second mold part to separate the first mold part from the body and cap. Thereafter, engaging at least the body with a robotic arm and moving the body with the robotic arm into a capping device while the body and cap are at a temperature at which the material is not fully set. The body is then sealed by moving the cap into engagement with the body to form a leak proof seal.

In accordance with another aspect of the invention, an apparatus for forming an leak proof body with a cap includes a mold, robotic arm and a capping device. The mold has a first mold part, a second mold part and a mold cavity formed between the first and second mold parts. An injecting means for injects a molten material into the mold cavity to form a body and a cap. A retracting means retracts the first mold part from the second mold part to separate the first mold part from the body and cap. The robotic arm is configured to engage the body and cap, and move the body and cap from the mold to the capping device. The capping device seals the cap on the body while the body and cap are at a temperature at which the material of the body and cap is not fully set.

BRIEF DESCRIPTION OF THE DRAWINGS

The invention will be describe in greater detail with reference to the accompanying drawings in which like elements bear like reference numerals, and wherein.

DETAILED DESCRIPTION OF THE PREFERRED EMBODIMENTS

Figure 1:
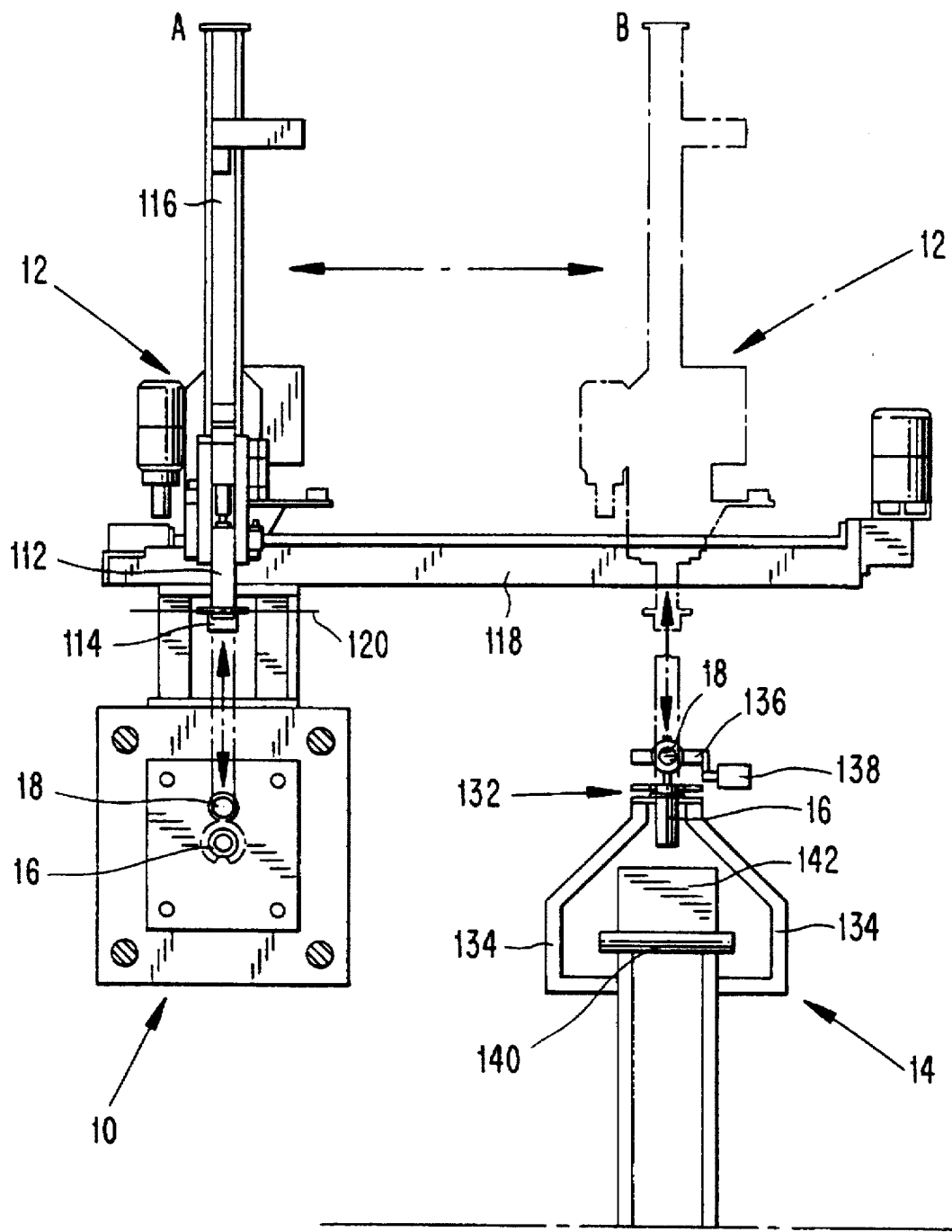
FIG. 1 is a side view, in partial cross section of a preferred embodiment of the invention.

With reference to FIG. 1, the preferred embodiment of the present invention includes a mold 10 for forming a leak proof body and cap, a robot 12 for transporting the body, and a capping device 14 for sealing the cap on the body.

The apparatus and process of the present invention can be used to make a variety of bodies including bottles, vials, spouts or any other container requiring a leak proof seal. The invention will be described in the drawings and description with respect to a vial. However, it should be understood that the process and apparatus of the invention applies equally to any body having a leak proof plastic seal.

Figure 3:
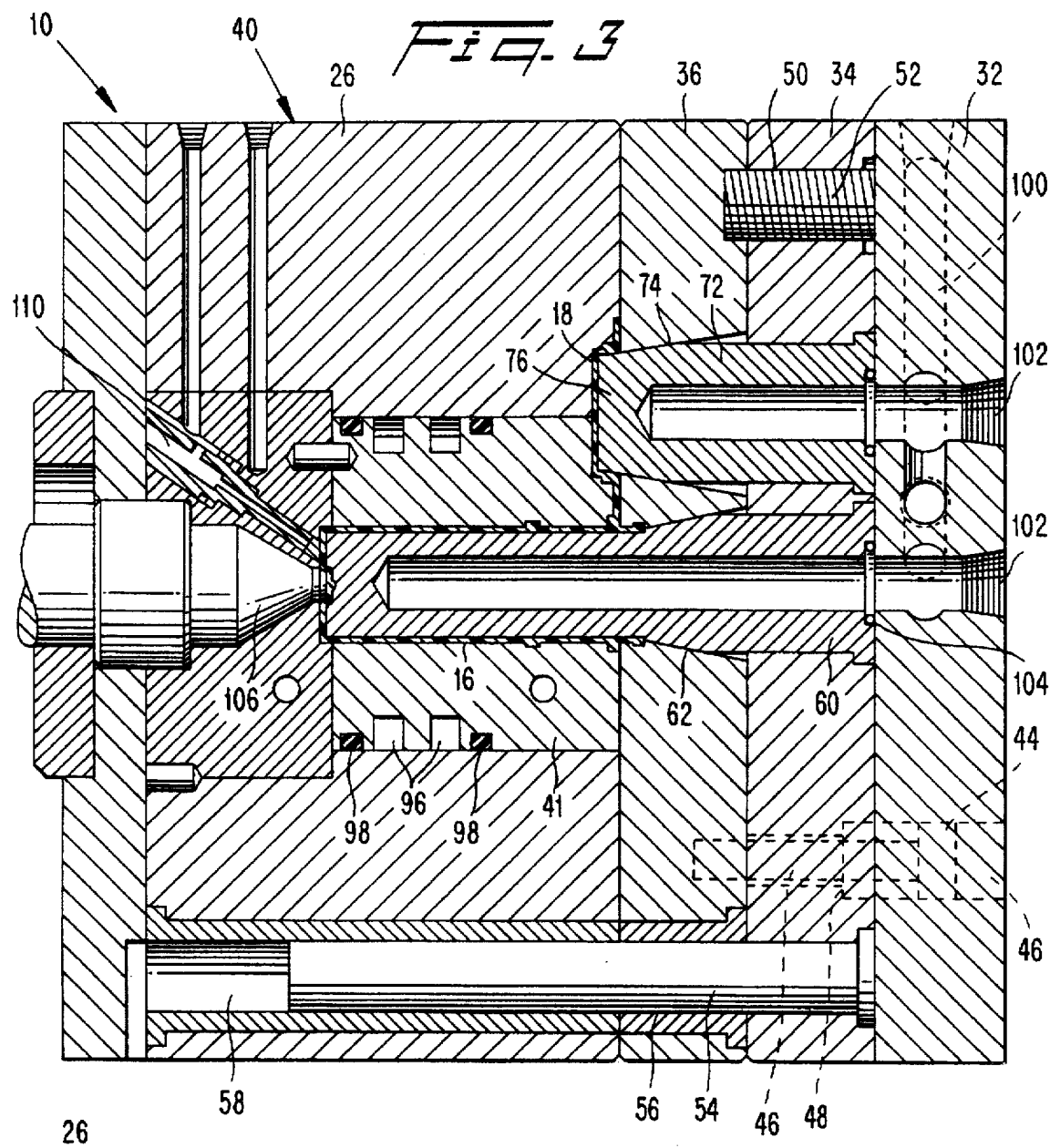
FIG. 3 is a side view, in a partial cross section of the preferred embodiment of the mold.
Figure 4:
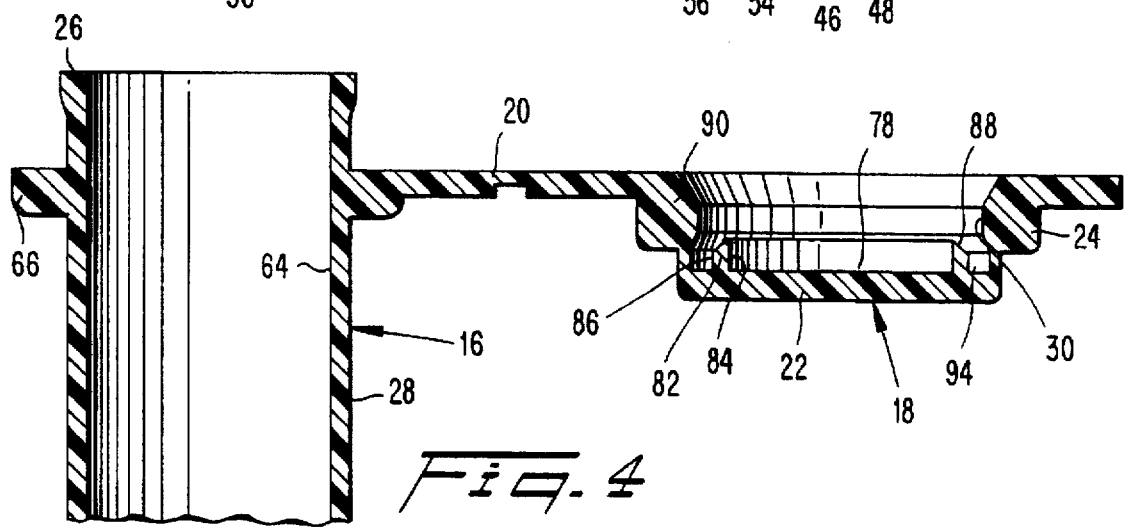
FIG. 4 is a cross-sectional view of a body and cap according to the present invention.

The vial 16, as best shown in FIGS. 3 and 4, is preferably cylindrical in shape with an integrally formed bottom. A cap 18 is provided which is adapted to seal the vial closed with a substantially hermetic seal. The cap 18 is preferably integrally connected to the vial 16 with a small flange 20. The vial 16 and cap 18 are preferably injection molded in the mold 10 from a thermoplastic material.

The cap 18 includes a circular, flat center portion 22 having a rim 24 extending perpendicularly from the outer edge thereof. The rim 24 is intended to fit over the upper edge 26 of the outer wall 28 of the vial 16 in a sealing manner. A ridge 30 may be formed on the inside of the cap rim 24 to enhance the seal of the cap 18 to the vial 16.

As shown in FIG. 4, the vial 16 has an annular ridge 66 extending around the periphery of the vial 14. The ridge 66 and the smooth transition surface at the upper edge or rim 26 of the vial 16 form an annular region for interlocking with the cap 18.

Figure 2:
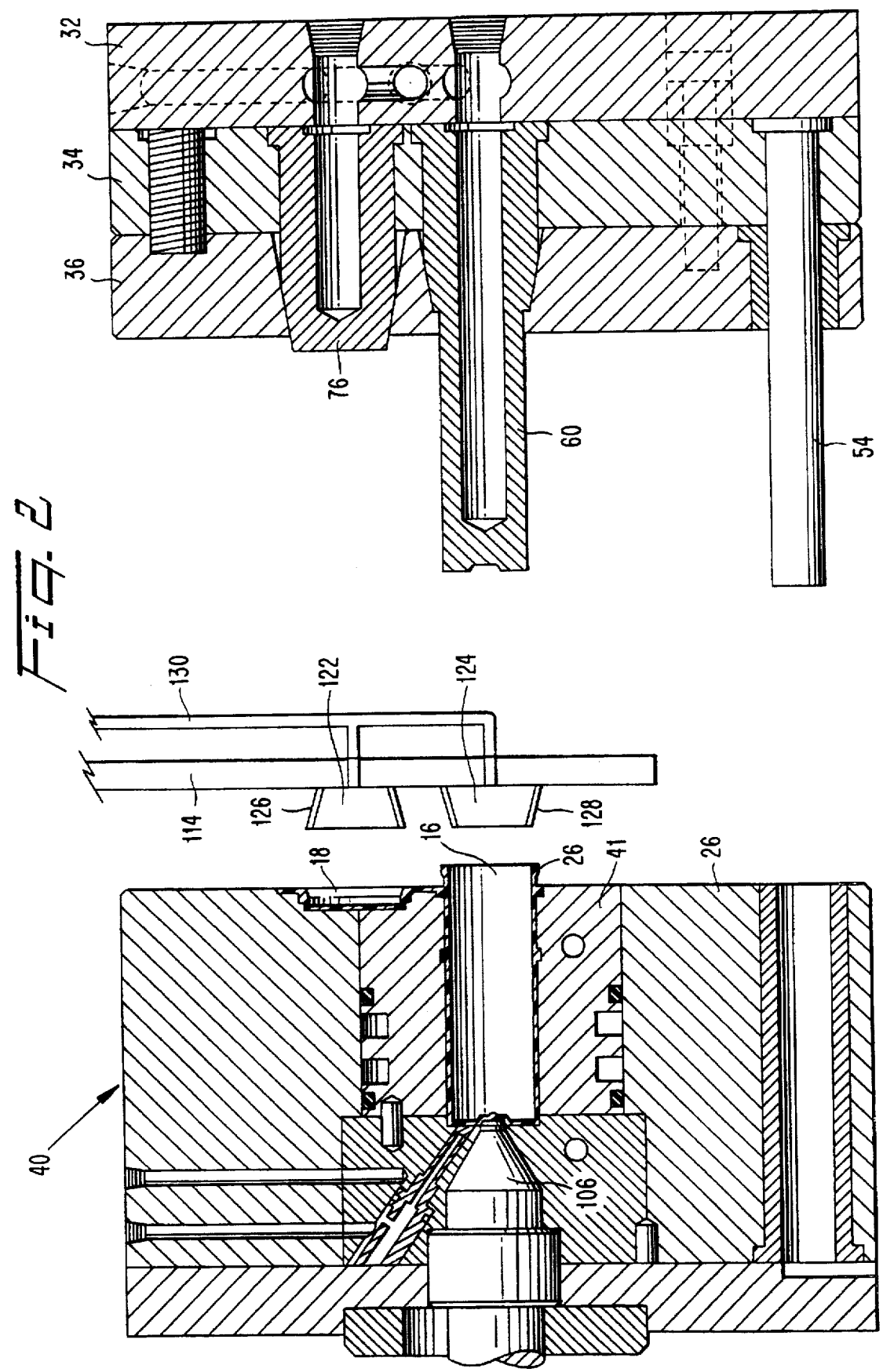
FIG. 2 is a side view, in partial cross section of the mold according to a preferred embodiment of the invention in an open position, with the robotic arm in position to receive the body and cap.

With specific reference to FIGS. 2 and 3, the mold 10 primarily includes a first mold part comprising an end plate or end mold part 32, an intermediate plate 34, and a stripper plate or interior mold part 36, and a second mold part comprising a central portion 38. The second mold part is arranged on a mold frame 40.

The intermediate plate 34 is connected to the end plate 32 by means of bolts or other suitable fastening means (not shown). When the mold 10 is in an original configuration, the stripper plate 36 is arranged between the intermediate plate 34 on one side and the frame 40 and the central portion 38, on the other side.

A press means (not shown) is provided to both hold all three plates 32, 34, 36 against the frame 40 with a predetermined pressure during the injection process and to retract the end and intermediate plates 32, 34 away from the frame 40 after the vial 16 has been injected. A bolt 42, threadedly engaged with the stripper plate 36 is arranged with its head 44 located within a chamber 46 in the end and intermediate plates 32, 34. A shoulder 48 of the chamber 46 is designed to engage the bolt head 44 after the end and intermediate plates 32, 34 have travelled about one inch away from the stripper plate 36. The contacting of the bolt head 44 with the shoulder 48 prevents any further separation of the stripper plate 36 from the end and intermediate plates 32, 34.

A cavity 50 is formed within the plates 32, 34, 36, and a spring 52, such as a red die spring, is arranged within the cavity 50 under compression when the mold 10 is closed. The effect of the spring 52 is to apply a repulsive force between the stripper plate 36 and the end and intermediate plates 32, 34.

Accordingly, when the press means is pulling the end and intermediate plates 32, 34 away from the frame 40, during the first inch of travel of the plates 32, 34, the spring 52 will hold the stripper plate 36 against the frame 40 with a reducing force. After about one inch of travel, the bolt head 44 will contact the chamber shoulder 48, and the stripper plate 36 will then be drawn by the press means away from the frame 40.

If the separation distance between the stripper plate 36 and the intermediate plate 34 is substantially greater than one inch, undesirable stresses are created in the spring 52. These stresses may lead to premature failure of the spring 52.

A rod 54 is fastened within the intermediate plate 34, and extends through an opening 56 in the stripper plate 36 and into a bore 58 located in the frame 40 of the mold 10. The rod 54 maintains the plates 32, 34, 36 in alignment with each other and with the frame 40 of the mold 10 during opening and closing of the mold. Preferably, once such rod arrangement is provided in each corner of the mold 10.

A first core 60 is mounted within the intermediate plate 34 so as to project through a first opening 62 in the stripper plate 36 and into a recess within the central portion 41 of the mold 10o The first core 60 provides a mold surface for forming the interior wall 64 of the vial 16 during the molding process. The first core 60 and the central portion 38 of the mold together form a mold cavity in which the vial 16 is formed.

A second core 72 is mounted within the intermediate plate 34 so as to project through a second opening 74 in the stripper plate 36. A base 76 of the second core 72 comprises the mold surface that forms the interior surface 78 of the vial cap 18. A recess 80 is provided in the base 76 of the second core 72 for forming an annular seal 82 projecting from the interior surface 78 of the vial cap 18. The first and second cores 60, 72 are described in more detail in U.S. Pat. No. 4,783,056 which is incorporated herein by reference.

As shown in FIG. 4, a seal 82 of the cap 18 is provided with an inner edge 84 and an outer edge 86 that are substantially perpendicular to the interior surface 78 of the vial cap 18. An end surface 88 of the seal 82 interconnects the inner edge 84 with the outer edge 86, and intersects the edges with an angle of about 45°.

The seal 82, and the cap rim 90 combine to form an annular region for interlocking with the interlocking annular region on the vial 16. The annular seal 82 is adapted to at least partially fit within the upper edge 26 of the vial wall 28. The end surface 88 is angled so as to guide the upper edge 26 of the vial wall into the annular gap 94 formed between the seal 82 and the outer cap rim 90.

The annular rim 26 of the vial 16 is designed to fit within the gap 94. When the vial is closed before the material of the vial is fully set a leak proof seal results between various engaging portions of the cap 18 and the vial 16.

With reference now to FIG. 3, the central portion 38 of the mold 10 fits within a recess in the frame 40. The central portion 38 has a substantially cylindrical recess, the wall of which provides a surface for forming the outer wall of the vial 16. Annular water channels 96 extend around an outer periphery thereof through which channels 96 water is circulated to facilitate cooling during the molding process. O-rings 98 are provided adjacent the channels 96 to maintain a seal around them.

The end plate 38 has a water channel 100 extending therethrough. The water channel 100 interconnects with water channels 102 extending longitudinally through the first and second cores 60, 72. O-rings 104 are positioned adjacent the interconnection of the water channels 102 of the cores 60, 72 and the water channel 100 of the end plate 32 in order to enhance the seal therebetween. The water channels 96, 100, 102 facilitate cooling of the mold during the molding process.

Located within the frame 40 of the mold 10 adjacent the base of the first core 60 is a sprue gate 106 through which molten plastic is injected into the mold 10. The diameter of the sprue gate 106 is preferably about 0.060", and is chosen to allow the plastic to be injected into the mold 10 at as rapid a rate as reasonably possible. The air vents 108 facilitate the rapid injection of plastic by allowing air present in the mold 10 to escape while the plastic is being injected.

Also located within the frame of the mold 10 adjacent the base of the first core is a poppet 110 which is used to eject the vial 16 from the mold 10 when the vial is sufficiently cooled to retain its shape but is still not fully set. The poppet 110 may be either an air poppet, as shown, or a mechanical pusher. The poppet 110 is preferably positioned at an angle with respect to the vial 16 so that the vial is ejected without marking the surface of the vial.

In operation of the mold 10, the end, intermediate and stripper plates 32, 34, 36 are held against the frame of the mold 10 with about 15 fifteen tons of pressure by a press means (not shown). Molten plastic is then injected through the sprue gate 106 with about fifteen tons of pressure so as to form the vial 16 and cap 18.

In an illustrative, preferred embodiment the injected vials are allowed to cool for about six seconds while the temperature thereof drops from about 550° F. to about 100°–120° F. The specific temperature to which the vial 16 is reduced may vary with the size and type of vial but should be cool enough so that the plastic will retain its shape, and hot enough so that the plastic is not fully set. Water is circulated through the water channels 96, 100, 102 of the mold 10 in order to accelerate the cooling of the vial 16 and the cap 18.

When the vial 16 and the cap 18 are sufficiently cooled, the end plate 32 and the intermediate plate 34 are withdrawn from the frame 40 of the mold 10. As described above, as the end and intermediate plates 32, 34 initially move away from the frame 40, the spring 52 acts between the stripper plate 36 and the end plate 32 to hold the stripper plate 36 against the frame 40. After the end and intermediate plates 32, 34 have separated from the stripper plate 36 by about one inch, the head 44 of the bolt 42 engages with the shoulder 48 of the chamber 46 within the end and intermediate plates 32, 34 and pulls the stripper plate 36 away from the frame 40. The rods 54 are guided within their respective openings 56 and bores 58 to maintain the three plates 32, 34, 36 in alignment with the frame 40 during the separation of the plates 32, 34, 36 from the frame 40. The first and second cores 60, 72 being attached to the intermediate plate 34, move away from the frame 40 together with the plates 32, 34, 36.

The plates 32, 34, 36 and the frame are preferably mounted on parallel rails (not shown) so that they remain in an aligned relationship even when the mold is opened. As seen in FIG. 2, the plates are moved away from the frame a sufficient distance to a allow a portion of a robotic arm 112 to move down between the plates 32, 34, 36 and the frame 40 and remove the vial 16 from the mold 10.

Although the invention has been described with respect to a particular mold it should be recognized that other types of molds could be used to form the bodies and caps according to the invention.

As shown in FIG. 1, a robot 12 is provided having at least three degrees of freedom for moving the vial 16 from the mold 10 to the capping device 14. The robot 12 includes the robotic arm 112 having a plate 114 attached to a lower end. The robotic arm 112, which is shown in a raised position in FIG. 1, is movable vertically on a vertically oriented track 116. The vertical motion of the robotic arm 112 allows the plate 114 to be lowered down to a position in which the plate 114 is directly in front of the vial 16 positioned in the central portion 41 of the mold. Alternatively, the robot 12 can be arranged to remove the vial from the side of mold 10.

The robot 12 is also provided with a horizontally oriented track 118 on which the robot 12 moves from a position A above the mold 10 to a position B above the capping device 14. The robotic arm 112 is provided with a pivot 120 having an axis parallel to the horizontally oriented track 118 so that the plate 114 may pivot at least 90°. An example of a robotic device which would be appropriate for performing the function of moving the vials quickly from the mold 10 to the capping device 14 is the W312 robot which is manufactured by Wittmann Robot & Automation Systems, Inc.

As shown in FIG. 2, the plate 114 on the end of the robotic arm 112 includes first and second suction cups 122, 124 mounted thereon. The first suction cup 122 is sized and configured to fit within and engage the cap 18 of the vial 16. The sides 126 of the first suction cup 122 are preferably angled outward from the center of the suction cup in a direction away from the plate 114. The second suction cup 124 is configured to fit within and engage the upper rim 26 of the vial 16 and is spaced from the first suction cup 122 an appropriate distance. The sides 128 of the second suction cup 124 are preferably angled inward toward the center of the suction cup in a direction away from the plate 114 so that the second suction cup 124 will fit easily within the upper rim 26 of the vial 16 without damaging the vial. The suction cups 122, 124 are preferably made of an extremely flexible plastic material which is more flexible than the material of the vial 16 and cap 18 so that the suction cups 122, 124 will not deform the vial and cap.

A vacuum source (not shown) is provided and a vacuum line 130 attaches the vacuum source to each of the suction cups 122, 124. It should be recognized that although the preferred embodiment utilizes two suction cups other embodiments using a single suction cup in either of the vial 16 or cap 18 are also be within the scope of the invention.

Although suction cups have been described as the preferred means for engaging the vial, other means for engaging can be used as long as they do not puncture or otherwise damage the vial. One such engaging means is a grasping claw which grasps the upper edge 26 of the vial 16.

In operation, the robotic arm 112 slides down along the vertical track 116 until the plate 114 is positioned so that the suction cups 122, 124 are aligned with the vial 16 and cap 18. The poppet 110 of the mold 10 is then activated to pop the vial 16 from the mold 10. The vial 16 is stopped from ejecting all the way from the mold 10 by the plate 114. The suction source is activated either immediately after or simultaneously with the activation of the poppet 110. The plate 114 then is moved away from the mold frame 40 to remove the vial 16 completely from the central portion 41 of the mold 10. This motion of the plate away from the central portion 41 to remove the vial completely from the mold may be provided by rotation of the robotic arm 112 about the pivot 120 in which case the vial would be slightly flexed. Alternatively, the vial may be removed from the central portion 41 of the mold 10 by providing a robotic device with an additional degree of motion which allows the vial 16 to be removed along the axis of the vial 16.

Once the vial 16 is completely removed from the central portion 41 of the mold frame 40 the plate 114 with the attached vial 16 is removed vertically from the mold 10. The robot 12 then travels along the horizontal track 118 to transport the vial 16 to the capping device 14. The vial 16 is then rotated into a vertical position by rotation of the plate 114 about the pivot 120. The vertically positioned vial 16 is then lowered into a holder 132 of the capping device 14 by moving the robotic arm 112 along the vertical track 116. The orientation of the mold 10, the robot 12 and the capping device 14, as shown in FIG. 1 is for convenience. However, other orientations may be used without departing from the scope of the invention.

In order to provide a seal between the cap and the vial which is leak proof the cap 18 must be mated with the vial rim 26 when the plastic is not yet set. The sealing of the cap to the vial while the plastic is not yet set allows the cap and vial to conform to each other and to form the required leak proof seal. However, the cap cannot be placed on the vial until the plastic has cooled enough so that the cap and vial will not melt into one another. Sealing of the cap too soon will cause the cap to be permanently fixed and unremovable.

It is necessary to remove the vial from the mold and move it to the capping device within a particular window of time where the plastic is rigid enough to be moved without deforming the vial 16 and the plastic is not yet fully set. This window of time will vary for different materials and different sizes and shapes of vials. The amount of time before some plastics set may be as long as 2 minutes, however, it is preferred that the vial is sealed within 1 minute of being formed. Most preferably the vial is formed, moved and closed within a 45 second window.

The capping device 14, as shown in FIG. 1, is used to close the cap 18 onto the vial 16 within the window of time in which the plastic of the vial 16 and cap 18 is rigid enough to withstand moving but is not yet fully set. The vial holder 132 is provided with two or more arms 134 which are preferably operated by pneumatic cylinders (not shown). However, it should be recognized that a mechanical mechanism may could also be used to open and close the arms 134.

A rotary flipper 136 is positioned adjacent the vial holder 132 for closing the cap 18 of the vial 16. The flipper 136 is shown in FIG. 1 in a position half way between an open position and a closed position. The flipper 136 is provided with an actuator 138 which may be either a pneumatic actuator or a motor driven actuator. According to a preferred embodiment of the invention, one or more controlled air jets (not shown) are provided which act on at least one surface of an arm of the flipper.

A conveyor 140 for transporting cartons 142 is positioned below the vial holder 132 so that the sealed vials may be dropped directly into the cartons 142. According to a preferred embodiment of the invention, the flipper 136 is provided with a sensor which senses when the flipper 136 has sealed the cap 18 on the vial 16. The arms 134 of the vial holder 132 move apart, in response to a signal from the sensor, to drop the sealed vial 16 into the awaiting carton 142.

While the invention has been described in detail with reference to specific embodiments thereof, it will be apparent to one skilled in the art that various changes and modification can be made, and equivalents employed, without departing from the spirit and scope of the invention.

We claim:

1. A process for forming a leak-proof body and cap comprising the steps of:

defining a mold cavity between a first mold part and a second mold part;

injecting a molten plastic material into at least one mold cavity in the second mold part thereby forming from the molten material a body and cap;

retracting the first mold part from the second mold part to separate the first mold part from the body and cap;

engaging at least one of the body and cap before the material is fully set with engagement means on a robotic arm;

removing the body and cap from the mold;

moving the body and cap with the robotic arm into a capping device while the body and cap are at a temperature at which the material is not fully set; and sealing the body in the capping device before the material is fully set by moving the cap into engagement with the body to form a leak-proof seal before the material is fully set.

2. The process claim 1, wherein the engaging step comprises:

inserting a receiving means between the first mold part and the body with the robotic arm;

ejecting the body partially from the mold until the body and cap engage the receiving means;

removing the body completely from the second mold part with the robotic arm.

3. The process of claim 2, wherein the ejecting step comprises activating a poppet in the mold.

4. The process of claim 2, wherein the receiving means inserted between the first mold part and the body is a plate having at least one suction cup thereon.

5. The process of claim 4, wherein the ejecting step comprises activating a suction source connected to the at least one suction cup.

6. The process of claim 1, further comprising a step, prior to the retracting step, of cooling the vial to a temperature at which the material will maintain its shape but is not fully set.

7. The process of claim 1, wherein the sealing step comprises pivoting a pivoting part to move the cap with respect to the body so as to guide the cap into engagement with the body to form a leak proof seal.

8. The process of claim 7, further comprising the steps of:

providing a signal which indicates when the pivoting part has sealed the cap on the body; and dropping the sealed body from the capping device in response to the signal.

9. The process of claim 1, wherein the temperature of the vial during the grasping, moving and sealing steps is about 100°–120° F.

10. The method of claim 1, further comprising the step or applying suction through the engagement means to engage said one of the body and cap.

11. The method of claim 1, wherein the engagement means is softer than the material.

12. The process of claim 1, wherein the step of engaging is performed without damaging sealing surfaces on the body and cap.

13. The process of claim 1, wherein the body and cap are formed with a connecting hinge.

14. The process of claim 1, wherein both the body and the cap are engaged by the engaging means.

15. A process for forming an aseptic, leak-proof vial with a cap comprising the steps of:

defining a mold cavity between an end mold part and an interior mold part on one side and a second mold part on the other side, wherein said interior mold part and said second mold part are in direct contact with each other;

injecting a molten material into the mold cavity thereby forming from the molten material a vial and a cap, said vial having an annular region at the top edge thereof for interlocking with an annular region at the interior periphery of the cap;

retracting the end mold part from the interior mold part to separate the end mold part from the vial and cap while applying a biasing force against the interior mold part so as to bias the interior mold part against the rest of the mold to retain the vial and cap within the second mold part;

limiting the distance that the end mold part is separated from the interior mold part;

retracting the interior mold part from the second mold part when the end mold part has been retracted a predetermined distance from the interior mold part;

ejecting the vial and the cap at least partially from the mold before the material is fully set;

engaging at least one of the vial and cap with engagement means on a robotic arm;

moving the vial with the robotic arm into a vial holder having a pivoting part while the vial is at a temperature at which the interior of the vial is in an aseptic condition and the material has not fully set;

pivoting the pivoting part to move the cap with respect to the vial so as to guide the interlocking annular region of the cap onto the corresponding interlocking annular region of the vial so as to seal the cap on the vial before the material is fully set and while the interior of the vial is in an aseptic condition.

16. The process of claim 15, further comprising the steps of:

providing a signal which indicates when the pivoting part has sealed the cap on the vial; and dropping the sealed vial from the vial holder in response to the signal.

17. The process of claim 15, further including a step of venting from the mold cavity gases that are released during the injecting step.

18. The process of claim 15, further comprising a step of cooling the vial and cap to about 100°–120° F. before retracting the end mold part.

19. The process of claim 15, wherein the temperature of the vial during the grasping, moving and sealing steps is cool enough so that the material is not deformed and is hot enough so that the material is not fully set.

20. The process of claim 19, wherein the temperature of the vial during the grasping, moving and sealing steps is about 100°–120° F.

21. A process for forming a leak-proof body and cap comprising the steps of:

defining a mold cavity between a first mold part and a second mold part;

injecting a molten plastic material into at least one mold cavity in the second mold part thereby forming from the molten material a body and cap;

inserting a receiving means between the first mold part and the body with a robotic arm;

ejecting the body partially from the mold before the body and cap are fully set until the body and cap engage the receiving means;

removing the body completely from the second mold part with the robotic arm;

moving the body and cap with the robotic arm into a capping device while the body and cap are at a temperature at which the material is not fully set; and sealing the body before the material is fully set by moving the cap into engagement with the body to form a leak-proof seal.

22. The process of claim 21, wherein the step of engaging is performed without damaging sealing surfaces on the body and cap.

23. The process of claim 21, wherein the ejecting step comprises activating a poppet in the mold.

24. The process of claim 21, wherein the receiving means inserted between the first mold part and the body is a plate having at least one suction cup thereon.

25. A process for forming a leak-proof body and cap comprising the steps of:

defining a mold cavity between a first mold part and a second mold part;

injecting a molten plastic material into at least one mold cavity in the second mold part thereby forming from the molten material a body and cap;

retracting the first mold part from the second mold part to separate the first mold part from the body and cap;

removing at least partially the body and cap from the mold cavity before the material is fully set;

engaging at least one of the body and cap before the body and cap are fully set with engagement means on a robotic arm;

moving the body and cap with the robotic arm into a capping device while the body and cap are at a temperature at which the material is not fully set;

sealing the body before the material is fully set by moving the cap into engagement with the body to form a leak-proof seal.

26. An apparatus for forming a leak-proof body with a cap comprising:

a mold having a first mold part, a second mold part and a mold cavity formed between the first and second mold parts;

injection means for injecting a molten material into the mold cavity to form a body and a cap;

retraction means for retracting the first mold part from the second mold part to separate the first mold part from the body and cap;

a robotic arm having engagement means configured to engage at least one of the body and the cap before the body and the cap are fully set and to move the body and cap from the mold to a capping device before the material is fully set; and a capping device for sealing the cap on the body while the body and cap are at a temperature at which the material of the body and cap is not fully set.

27. The apparatus of claim 26, further comprising:

a plate mounted on the robotic arm for engaging the body and cap; and a grasping means on the plate for grasping either the body or the cap.

28. The apparatus of claim 26, wherein the capping device further comprises a pair of movable arms for holding the body and a flipper for moving the cap into engagement with the body.

29. The apparatus of claim 26, further comprising suction means for engaging said one of the body and cap.

30. The apparatus of claim 26, wherein the engagement means is softer than the not fully set material.

* * * * *